Dec. 1, 1942.   W. SCHILLING   2,303,505
ELECTRIC DISCHARGE APPARATUS
Filed May 17, 1939   8 Sheets-Sheet 1

WITNESSES:
C. J. Weller.
Hymen Diamond

INVENTOR
Walter Schilling
BY F. W. Lyle
ATTORNEY

Dec. 1, 1942.    W. SCHILLING    2,303,505
ELECTRIC DISCHARGE APPARATUS
Filed May 17, 1939    8 Sheets-Sheet 2

WITNESSES:

INVENTOR
Walter Schilling.
BY
ATTORNEY

Dec. 1, 1942.  W. SCHILLING  2,303,505
ELECTRIC DISCHARGE APPARATUS
Filed May 17, 1939   8 Sheets-Sheet 4

WITNESSES:
C. J. Weller.
Hymen Diamond

INVENTOR
Walter Schilling.
BY
F. W. Lyle.
ATTORNEY

Dec. 1, 1942.   W. SCHILLING   2,303,505
ELECTRIC DISCHARGE APPARATUS
Filed May 17, 1939   8 Sheets-Sheet 5

WITNESSES:

INVENTOR
Walter Schilling.
BY
ATTORNEY

Dec. 1, 1942.  W. SCHILLING  2,303,505
ELECTRIC DISCHARGE APPARATUS
Filed May 17, 1939  8 Sheets-Sheet 6

WITNESSES:

INVENTOR
Walter Schilling.
BY
ATTORNEY

Dec. 1, 1942.  W. SCHILLING  2,303,505
ELECTRIC DISCHARGE APPARATUS
Filed May 17, 1939  8 Sheets-Sheet 7

WITNESSES:

INVENTOR
Walter Schilling.
BY
ATTORNEY

Patented Dec. 1, 1942

2,303,505

UNITED STATES PATENT OFFICE 2,303,505

ELECTRIC DISCHARGE APPARATUS

Walter Schilling, Finkenkrug, near Berlin, Germany, assignor to Westinghouse Electric & Manufacturing Company, East Pittsburgh, Pa., a corporation of Pennsylvania Application May 17, 1939, Serial No. 274,232
In Germany April 23, 1938

37 Claims. (Cl. 250—27)

A problem often countered in the electrical art is to supply electrical loads with energy of constant magnitude.

The invention makes possible the attainment of this object in a particularly simple and propitious manner.

In accordance with the invention, a valve which may be connected in the load circuit itself or in an auxiliary circuit associated with the load circuit, is actuated in dependence upon the charging potential of a main condenser in such manner that the closed circuit time of the valve varies indirectly with the square of the load current. Preferably, the main condenser is fed through a (regulating) impedance from a potential, the mean value of which is proportional to the square of the consumer current strength. The potential is composed of impulses periodically following each other which individually have potential-time areas proportional to the square of the load current. In accordance with the invention, the charging potential of the main condenser is used for the excitation or the deexcitation of an auxiliary circuit which is operatively connected with the load circuit valves. Preferably, the auxiliary circuit is controlled by discharge paths, preferably of the gas or vapor type, the control circuits of which are supplied with the charging potential of the main condenser functioning as ignition or blocking potential.

By means of the invention, current variations are compensated in the load circuit by corresponding variations of the current charging interval so that the load is supplied with constant energy.

If, for example, a condenser is charged from a direct current potential $U_0$ through a resistance R, its charging potential follows the time law $$U = U_0\left(1 - e^{\frac{-t}{RC}}\right)$$

In the linear portion of the corresponding charging curve $$U = \left(\frac{dU}{dt}\right)_{t=0} \cdot t$$

or $$U = \left(\frac{U_0}{RC} \cdot e^{\frac{-t}{RC}}\right)_{t=0} \cdot t$$

or $$U = \frac{U_0}{RC} \cdot t$$

For suitable selection of the resistance R, the charging of the main condenser is, accordingly, proportional to $U_0$. If now $U_0$ is selected proportional to the square of the current strengths of the load circuit, the time which is necessary to charge the condenser to a definite potential is inversely proportional to the square of the load current strengths. The same also holds in such a case for the closed circuit time of the load values. The energy supplied to the load remains constant in spite of fluctuations in the current.

If, in place of the direct current potential $U_0$, there is a series of polarized potential impulses, then the above derived considerations apply for the individual potential impulses as well as for the whole succession of potential pulses.

The two cases of the use of a condenser potential in the control of the auxiliary circuit discharge paths, (namely, as ignition potential and as blocking potential), correspond to the two modes of operation of the auxiliary circuit. In one case the auxiliary circuit becomes conductive when the potential is applied (ignition method) and in the other it becomes non-conductive (extinction method). Under certain conditions, one type of operation will be of advantage and under others, the other type. The current supplying the auxiliary circuit or the discharge paths is in certain cases direct, and in other cases alternating.

The apparatus, according to the invention, is, with advantage, applicable to mechanically operating valves as well as to controllable discharge paths connected in the load circuit or in an auxiliary circuit connected to the load circuit. In the latter case the auxiliary circuit is preferably in operative relationship with a potential determining valve in the control circuit of the load circuit discharge paths. In advantageous application of the ignition method, the connection between the potential determining members and the auxiliary circuit is such that with the closing of the auxiliary circuit by rendering conductive a controllable discharge path, the control potential of the load circuit discharge paths is decreased to a blocking value. In other cases where the extinction method is used, the above-mentioned connection is such that the opening of the auxiliary circuit leads to a decrease of the control potential of the load circuit discharge paths to the blocking value. Whether there is advantage in connecting a potential determining member in the individual control circuits or to a member in a common control branch of the load circuit discharge paths depends on the arrangement of discharge paths which is selected. The potential determining member is an impedance which is connected in the auxiliary circuit as well as in the control circuit of the load circuit discharge paths in accordance with the invention provided.

The periodically successive impulses used for feeding the main condenser are preferably of triangular wave form. Such impulses are provided by connecting the condenser to an alternating potential, the wave form of which has linear rising or falling sides, or has at the peak contiguous sides which are linear, and otherwise has any desired curve form. The connection is controlled, at the linear portions of the waves by a second potential, the phase or magnitude of which depends linearly on the load current. An alternating potential of triangular curve shape may be most conveniently used as the potential, the wave of which rises or falls linearly or has, at the peak, contiguous sides which are linear.

The supply potential is preferably controlled with the aid of gas or vapor discharge paths, the anode potential of which is of triangular wave shape. The control potential of the discharge paths is made up of potential of triangular wave form in opposite phase to the supply potential, a linear direct current potential dependent on the load current and a negative half wave potential of such magnitude and phase position that each discharge path is always blocked during the quarter period of the positive and rising supply potential.

The main condenser is charged in steps through a controlled discharge path supplied and controlled in the manner mentioned and an ohmic resistance. The mean value of the potential which, during the current conducting time of the discharge paths, affects the latter, determines the character of the individual steps. It is determined by the surface area of a triangle, which is cut out of the wave of the feeding potential and extends at its base from the ignition time point to the point at which the potential passes through zero. Since altitude and base of this triangular section are respectively proportional to the load current, its surface area is proportional to the square of the consumer current. This applies to the individual charging impulses of the main capacitor.

The application of the subject matter of the invention to electric spot welding with the aid of controllable gas or vapor discharge paths is particularly advantageous.

In the main circuit of such a spot welding machine, the welding material is moved between two electrodes. The welding current is supplied by the secondary winding of a transformer which on the primary side is supplied through controllable gas or vapor discharge paths, in general, connected in anti-parallel from an alternating current source. In this arrangement the connection of the secondary winding with the welding electrodes consists of a comparatively wide conducting loop.

Prior art welding devices of this type are inductive for predetermined intervals, i. e., to produce an individual welding spot, the welding electrodes are supplied with a definite number of half waves of the welding current. The fixed circuit closed time is the cause of sharp fluctuations in the quality of the spots.

The inductance of the secondary conducting loop increases as an electromagnetic material is introduced further and further into the loop. The consequence of this is a decrease in the welding current and—because of the fixed circuit closed time—a decrease in the energy used for the corresponding spots. The successive individual spots are accordingly produced with the energy supply decreasing. Similar fluctuation of the energy quantities which are used in the formation of the individual welding spots arises as a result of the different ohmic resistances of the work material. The invention compensates for the energy fluctuations caused by variations of the welding current by correspondingly controlling the welding interval in simple manner and with high accuracy.

The heat treatment of work in electrical induction furnaces is suggested as a further sphere to which the invention is, with advantage, applicable.

Further advantages and advantageous developments of the invention are shown by the exemplary embodiments in the drawings, in which.

Figure 1:
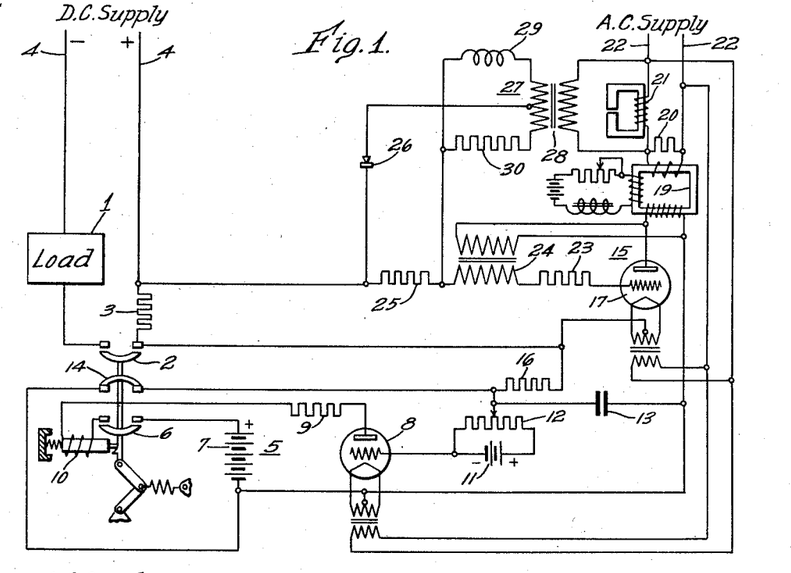
Figure 1 is a diagrammatic view showing an embodiment of my invention.

The embodiment shown in Fig. 1 relates to the supply of energy to a direct current load through a mechanically operating switch.

The load 1 is connected to the direct current source 4 through the mechanically actuable switch 2 and the impedance 3. The auxiliary circuit 5 is composed of the switch 6, the direct current source 7, the gas-filled controllable discharge path 8, the resistance 9 and the relay coil 10.

In the grid circuit of the discharge path 8, is the blocking potential source 11 shunted by a resistance 12 with a regulable tap. The reservoir condenser 13 (main condenser) is connected to the regulable tap of impedance 12 and the cathode of path 8. The main condenser 13 may be short-circuited by a switch 14. The intermediate circuit 15 is also connected to the condenser. The components of the intermediate circuit are a resistance 16, a gas or vapor filled controllable discharge vessel 17 and the transformer 19, which serves as a source of alternating potential of triangular wave form. The primary winding of transformer 19 is bridged by the resistance 20 and is connected through the saturable auxiliary choke 21 to the alternating potential source 22. The grid-cathode circuit of the discharge vessel 17 is closed through the grid resistor 23, the secondary winding of transformer 24, the additional resistance 25 and the load circuit impedance 3. The resistance 25 as well as the transformer 24 is connected to the alternating potential source 22, the former through the rectifier path 26, the phase shifting arrangement 27 and transformer 28; the latter through the transformer 19. The rectifier path 26 is connected to a midtap of transformer 28 on the secondary side. The phase shift arrangement 27 consists of an inductance 29 and an ohmic resistance 30 supplied from the transformer 28. A dry rectifier 26 is to be preferred. The switches 2, 6 and 14 are coupled to each other in such manner that the closing (opening) of switch 2 effects the closing (opening) of switch 6 and the opening (closing) of switch 14.

Figure 2:
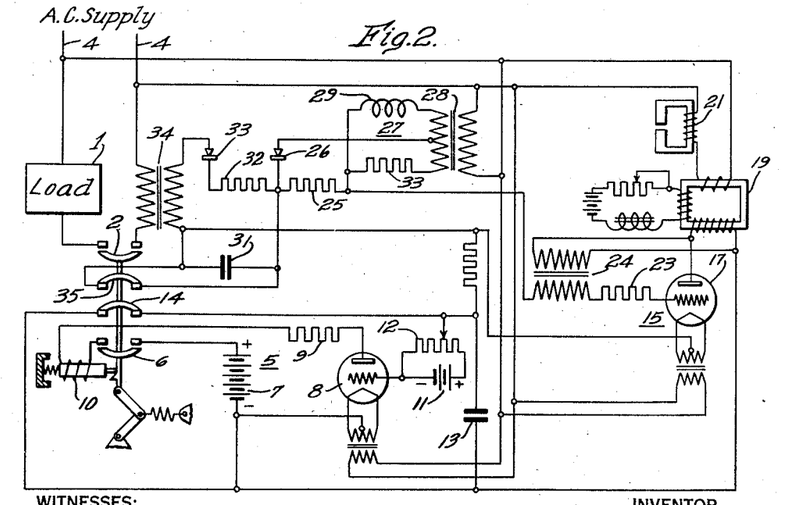
Fig. 2 is a diagrammatic view of a modification of my invention.

In Fig. 2 an embodiment corresponding to Fig. 1 for the case of an alternating current supplied load circuit is reproduced. The circuit parts taken over from Fig. 1 are provided with the same reference identifications.

In place of the direct current potential source 3 of Fig. 1, there is here a condenser 31. It is connected through the resistance 32 and the rectifier path 33 to the secondary winding of transformer 34. The alternating potential source 22 of Fig. 1 is replaced by the supply alternating potential. Rectifier 33 is preferably of the dry type. The condenser 31 is bridged by a switch 35 in the same manner as condenser 13. The switch 35 is coupled mechanically to the switches 2, 6 and 14 so that its opening (closing) takes place simltaneously with the closing (opening) of the consumer switch 2.

Figures 3A, 3B, 3C, 4:
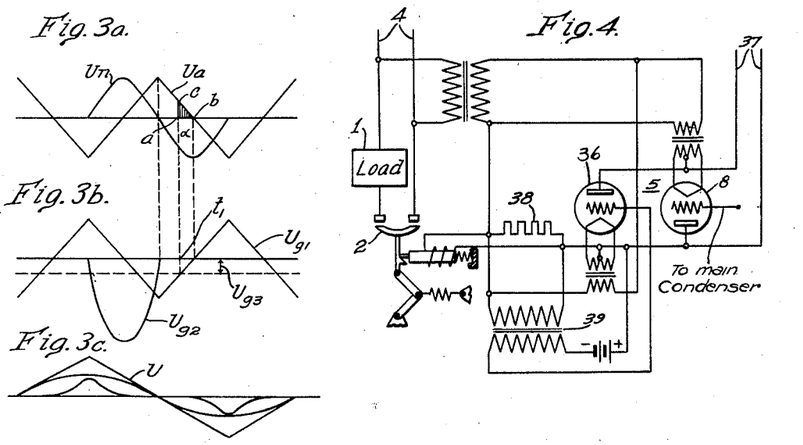
Figs. 3a, 3b and 3c are graphs illustrating an essential feature of my invention.
Figs. 4 and 5 are diagrammatic views of further modifications of my invention.

The operation of the embodiments illustrated in Figs. 1 and 2 depends on the variation of the anode and the grid potential of the discharge vessel 17. It is illustrated in Figs. 3a and 3b. In these, the curve $U_n$ represents the course of the alternating current potential feeding the load circuit or derived from 22. As regards wave form and phase position with reference to the potential $U_n$, $U_a$ represents the course of the anode potential of the discharge vessel 17. Triangular form and phase position of $U_a$ are to be attributed to the presence of the saturable auxiliary choke 21. Fig. 3b shows the grid potential of 17. The choke coil 21, which in Figs. 1 and 2 is connected in series with the transformer 19, cooperates with the transformer to charge the condenser 13 with a potential which varies in accordance with a triangular function as shown in Figs. 3a and 3b. The triangular-wave-form current is produced by connecting a choke 21 in series with the alternating current exciting winding of the highly saturable transformer 19. The explanation for the operation of this choke coil is given in British Patent No. 439,729 of 1935, which relates to the grid control of discharge vessels. The choke coil 21 is so constructed that it acts as two choke coils, of which one is essentially an air choke, the other, on the other hand, a saturable choke. The total current is composed of a sinusoidal current and of a current of peaked form, as is illustrated in the diagram in Fig. 2 of the British patent reproduced as Fig. 3c herein. When the two are combined the result is the triangular wave-shaped current which is identified in Fig. 2 of the British patent with the numeral 5 and in Fig. 3c as $u$.

For the purpose of simplicity, it is assumed that the ignition characteristic line of vessel 17 is coincident with the zero line. The graph shows that the triangular potential $U_{g1}$ induced in the grid circuit of vessel 17 through transformers 19 and 24 is in phase opposition to the triangular-shaped anode potential $U_a$. $U_{g2}$ shows the course of that grid potential component which is impressed on the impedance 25 from the alternating current potential sources 4 or 22 through the transformer 28, the phase shift arrangement 27 and the dry rectifier 26. The phase shift arrangement 27 is so dimensioned and the current conduction direction of the rectifier path 26 is so selected that the half wave potential $U_{g2}$ introduced by them into the grid circuit prevents ignition of discharge vessel 17 when the potential $U_a$ has positive rising sides. The distance between the full and the dash line represents the magnitude of the direct current potential $U_{g3}$ derived at impedance 3 or impressed on the condenser 31. The condenser potential is proportional to the peak value of the load current. Corresponding to the polarity of the current conducted by impedance 3 and the current conducting direction of the rectifier paths 33, $U_{g3}$ represents a positive grid bias impressed on the discharge vessel 17.

With switches 2, 6 open and switches 14, 35 closed, the discharge path 17 is non-conductive. By proper selection of the individual potentials in the grid circuit, the condition is attained that the total grid potential cuts the ignition characteristic line at a time point which coincides with the passage of $U_a$ through zero when it is becoming negative $b$. If the switches 2, 6 are closed and simultaneously the switches 14, 35 are opened, condenser 31 charges to a direct current potential, the amplitude of which is proportional to the peak value of the load current. The triangular shaped grid potential $U_{g1}$ is raised by the amount $U_{g3}$. The consequence is the ignition of the tube 17 at a time point $t_1$ which corresponds to intersection point of the dash line with the grid potential curve $U_{g1}$ in Fig. 3b.

For a given frequency and amplitude of source 22, the magnitude selected for resistor 16 and capacitor 13 is such that the linear relationship $$U = \frac{U_0}{RC} t$$

applies for the potential to which the condenser is charged by each impulse. For the case illustrated in Fig. 3, $t = a\ b$ and $U_0$ is proportional to $a\ c$.

Therefore, U is proportional to the area of the shaded triangle $a, b, c$ in Fig. 3a.

Its base line is equal to the ignition angle $\alpha$ which in its turn is determined by the intersection point of the linear curves $U_{g1}$ and $U_{g3}$. This signifies that the base line $a—b$ of the triangle $a, b, c,$ is proportional to the load current. Since in consequence of the linear rising and falling course of $U_a$, the triangle altitude is proportional to the ignition angle and with this to the load current, the triangle area and, accordingly, also the individual charging impulse of condenser 13 must be proportional to the square of the load current. The individual charging impulses follow each other in the frequency of the potentials $U_a$ and $U_{g1}$. The course of the condenser potential is represented by a stepped curve, the rise of each individual step as also the total height of which is proportional to the square of the consumer current strength. As a consequence, the time interval within which the charging of condenser 13 leads to the equalization of the blocking potential derived at impedance 12, and therefore to ignition, is inversely proportional to the square of the load current. At the instant at which tube 8 ignites, coil 10 pulls up and opens the switch 2. The immediate operation of coil 10 is made possible by the series resistance 9. When switch 2 is opened, switch 6 is simultaneously opened and switches 14 and 35 closed. Thus each current variation of the load circuit is in fact compensated by a corresponding variation in the current charging interval tending to maintain constant the energy supplied to the consumer. In place of the illustrated electromagnetic connection between the coils and the switching apparatus 2, an electrodynamic arrangement may be used.

In the apparatus shown in Figs. 1 and 2, the auxiliary circuit is supplied with direct current. In certain cases it will be advantageous to replace the direct current supply by an alternating current supply. An example of this is the case of a load circuit supplied with alternating current. In accordance with the invention, the auxiliary circuit supplied with alternating current has two controllable discharge paths connected in anti-parallel. One of the paths (follow along discharge path) has a grid circuit so coupled with the other path that on the extinction of the latter path (controlled discharge path), an ignition impulse is impressed in the grid circuit.

Fig. 4 shows a preferred embodiment of the alternating current auxiliary circuit 5.

The switch 2 in the load circuit is again actuated by an electromagnetic relay. The auxiliary circuit 5 is closed through the relay coil 10, the anti-parallel connected grid controlled discharge paths 8 and 36, and the alternating current potential source 37. Parallel to the coil 10, a resistance 38 is connected; the latter is in turn connected through transformer 39 to the grid circuit of the discharge vessel 36. The grid circuit of 36 contains, in addition, a blocking potential source. The grid cathode circuit of the discharge vessel 8 is connected to the main condenser.

When the discharge path 8 fires as a consequence of the sufficient charging of the main condenser 13, the potential impressed on the follow discharge path 36 is reduced. By reason of the reservoir effect of coil 10, the current in coil 10 and resistor 38 is of the same magnitude but of opposite polarity, at the instant when the current through the discharge path 8 becomes equal to zero. Accordingly, at the instant of the extinction of tube 8 there flows in the circuits formed by coil 10 and transformer 38, a current which causes an ignition impulse to be applied to the grid of discharge vessel 36. For the rest, the operation of the whole arrangement is the same as in the circuits shown in Figs. 1 and 2. The alternating potential 37 may, with advantage, be derived from the supply alternating current source. The switch 6 is superfluous here because with the opening of switch 2 and the closing of switches 14 and 35, the discharge paths 8 and 36 become extinguished automatically because they are supplied with alternating potential. Also the impedance 9 is eliminated here because of the alternating current supplied auxiliary circuit.

In the embodiments of the invention described heretofore, the main condenser is connected with one of its terminals to the regulable tap of the resistor 12. The resistor 12 serves to regulate the operating range of the system. Under certain circumstances it may be advantageous to use in lieu of the resistor 12, an impedance 16 which is regulable. A further possibility for the regulation of the operating range consists in the introduction of direct current potential sources in the grid and the anode circuit of the intermediate circuit discharge paths 17. The polarities of these potentials must, in this case, be so selected that the anode and grid potentials rise and fall together.

In the above embodiments the ignition method is used in the operation of the auxiliary circuit. The opening of the switch 2 results from the closing of the auxiliary circuit and this depends on the ignition of the discharge path 8. Now in this connection there exists an undesirable condition which at times may occur where discharge paths are utilized in that they lose their capacity of being ignited after having been in operation for a relatively long time. For the embodiments of Figs. 1, 2 and 4, such an event results in the permanent closing of switch 2. To avoid this undesirable occurrence, the extinction method is used in the operation of the auxiliary circuit—albeit there is substantial power consumption in the auxiliary circuit. The control potential of the leading discharge path is in this case composed of an alternating current potential component of definite phase position, preferably a potential of peaked wave form, a blocking potential component under certain circumstances variable and the negative charging potential of the main condenser. The alternating current potential component, preferably of peaked wave form, is introduced in the grid circuit of the leading discharge path in simple manner through a phase shift arrangement, a switch and a transformer. Its magnitude is preferably so selected, (for example, with the aid of a grid transformer of proper transformation ratio), that it is larger than the blocking potential component but may be exceeded by the sum of the blocking potential component and the negative charging potential of the condenser.

Figure 5:
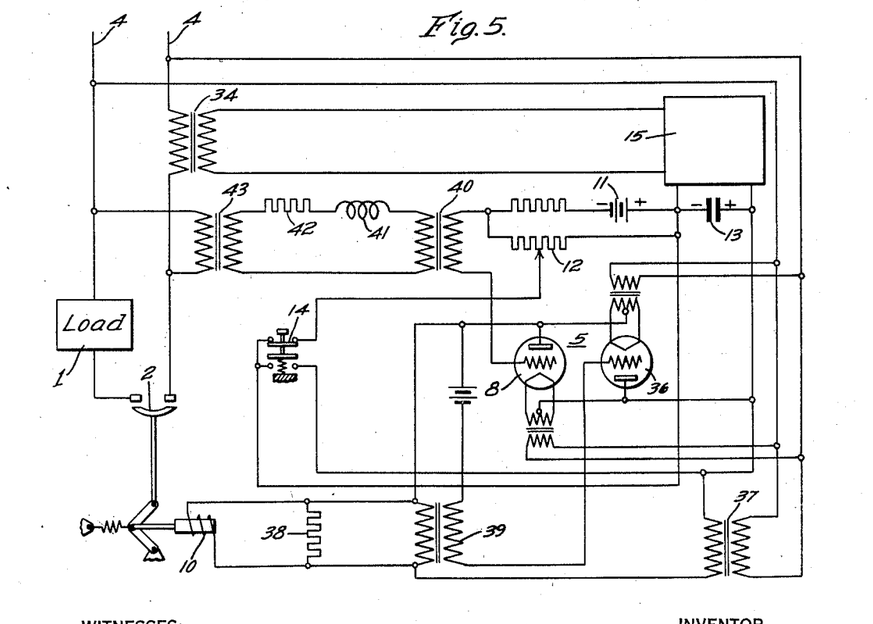

A particularly advantageous use of the extinction method in the auxiliary circuit is shown in Fig. 5.

The grid-cathode circuit of the leading discharge path 8 contains a transformer 40, which is supplied from the alternating current potential source 43 through a phase shifter consisting of an inductance 41 and an ohmic resistance 42. The dimensioning of the latter auxiliary circuit is such that in the grid circuit of tube 8, a potential of peaked wave form is impressed. In place of the single pole switch 14, a two-pole switch is used. In the depressed position of the switch 14 the condenser 13 is short-circuited and the whole blocking potential of vessel 8 is applied; in its raised position the switch 14 opens circuits the reservoir condenser 13 and short circuits a portion of the blocking potential of vessel 8. The switch 2 is here equipped with a device which holds it in the open position or pulls it back to this position as long as the holding coil 10 is currentless or when it becomes currentless. The peak potential is selected smaller than the total blocking potential but larger than the potential tapped from resistor 12.

To initiate the supply of energy, the switch 14 is released so that it assumes the raised position. The short circuiting of a portion of impedance 12 decreases the grid bias potential of vessel 8 to a value which is exceeded by the peaked potential of transformer 40. The tube 8 now ignites so that the current flow through coil 10 causes switch 2 to close. The stepped charging of condenser 13 which simultaneously sets in, finally decreases the negative grid potential component of tube 8 again to a value such that it is no longer exceeded by the peaked potential. On the succeeding zero of the alternating potential 37, the tubes 8 and 36 become extinguished and the switch 2 returns to the open position.

Figure 6:
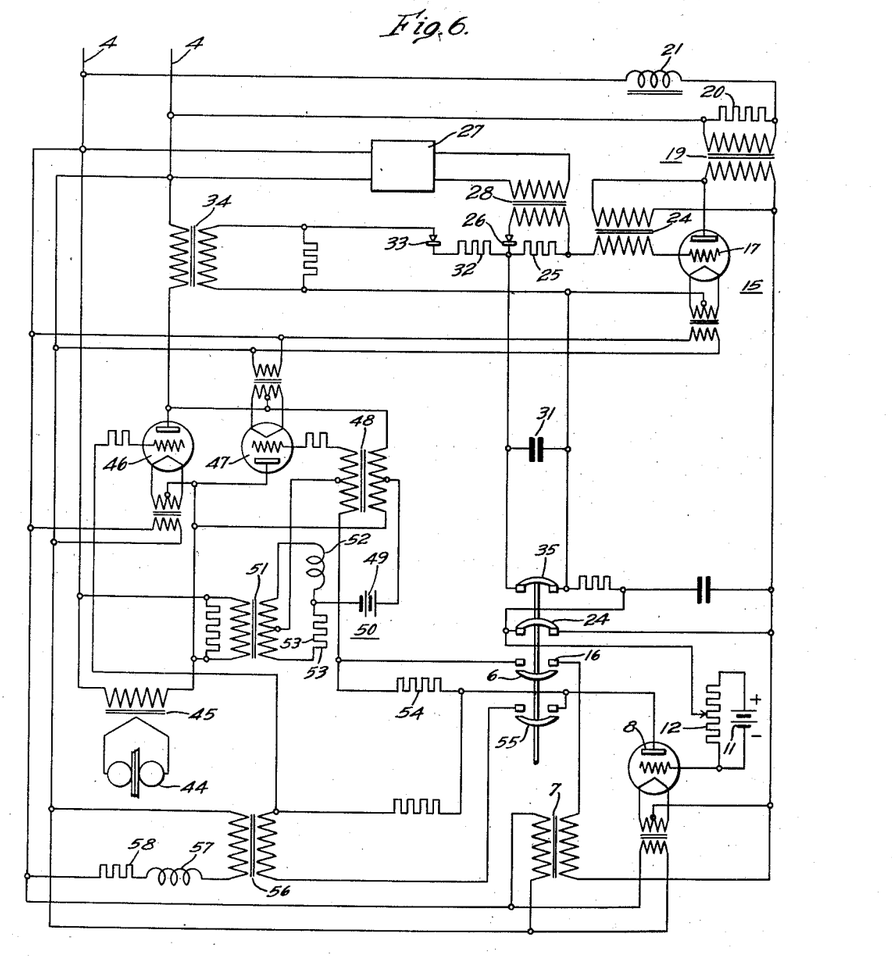
Fig. 6 is a diagrammatic view of a welding system embodying my invention.

In Fig. 6, an embodiment of the invention for the case in which controllable gas or vapor discharge paths are used as valves between an alternating current source and a load circuit is illustrated. In particular, a spot welder with controllable gas or vapor discharge paths is disclosed. The parts carried over from the circuits disclosed heretofore are again identified by unchanged references.

The welding electrodes 44 are connected to the secondary winding of the welding transformer 45 which, on the primary side, is supplied from the alternating source 4 through the gas or vapor discharge vessels 46 and 47 connected in anti-parallel. In the grid circuits of the discharge vessels 46, 47, there is the customary transformer 48 which operates as an auxiliary device to make possible the use of a single blocking potential source 49 for the anti-parallel connected discharge vessels 46, 47. The midtaps of the two windings of transformer 48 are connected to a phase shift circuit 50. The latter is supplied through the transformer 51 from the load circuit and comprises an inductance 52 and an ohmic resistance 53 connected in series. A resistance 54 is connected in the grid circuits of the discharge vessels 46, 47, as well as in the auxiliary circuit 5. The ignition method is used in the control of the latter and it is supplied with direct current. The system comprising switch 55, transformer 56, inductance 57 and ohmic resistance 58 and connected to resistor 54 serves to initiate the welding by introducing a peaked potential at a definite phase position in the grid circuit of discharge vessel 46. To suppress control transient impulses, the first ignition of the vessels 46, 47 must take place at an approximate 90° phase lag with reference to the supply potential. After the vessels 46, 47 have first been ignited, their connection on the grid circuit side with the load circuit (transformer 51) serves for further ignition. The switch 55 serving to initiate the welding process is coupled to the switches 6, 14 and 35 in the same manner as switch 2 of Fig. 2.

When the tube 8 ignites as a consequence of sufficient charging of condenser 13, a negative potential is introduced in the grid circuit of discharge vessel 46 through the impedance 54 and this drops the total control potential to the blocking value. Because the tubes 46, 47 are connected in a follow-up circuit, their further ignition is thus prevented.

The extinction method may also be used in the operation of the auxiliary circuit of a load which is supplied through controllable discharge paths. Preferably the control potential of the discharge paths controlling the auxiliary circuit (auxiliary discharge paths) is composed of a negative blocking potential component, a potential of peaked wave form of definite phase position, the negative charging potential of the main condenser and an additional alternating potential component which is regulable and which is, under certain circumstances, derived from the load circuit. The latter is, like the peaked potential, of a magnitude and phase position capable of producing ignition but is larger than the former and so selected in its phase position that it covers the peaked potential.

Preferably, the auxiliary alternating potential component is to be derived from a regulable impedance which is in parallel with a device for maintaining potential constant, for example, a glow tube with a series resistance which is connected on the one side, through a transformer, to the load circuit.

Figures 7, 8:
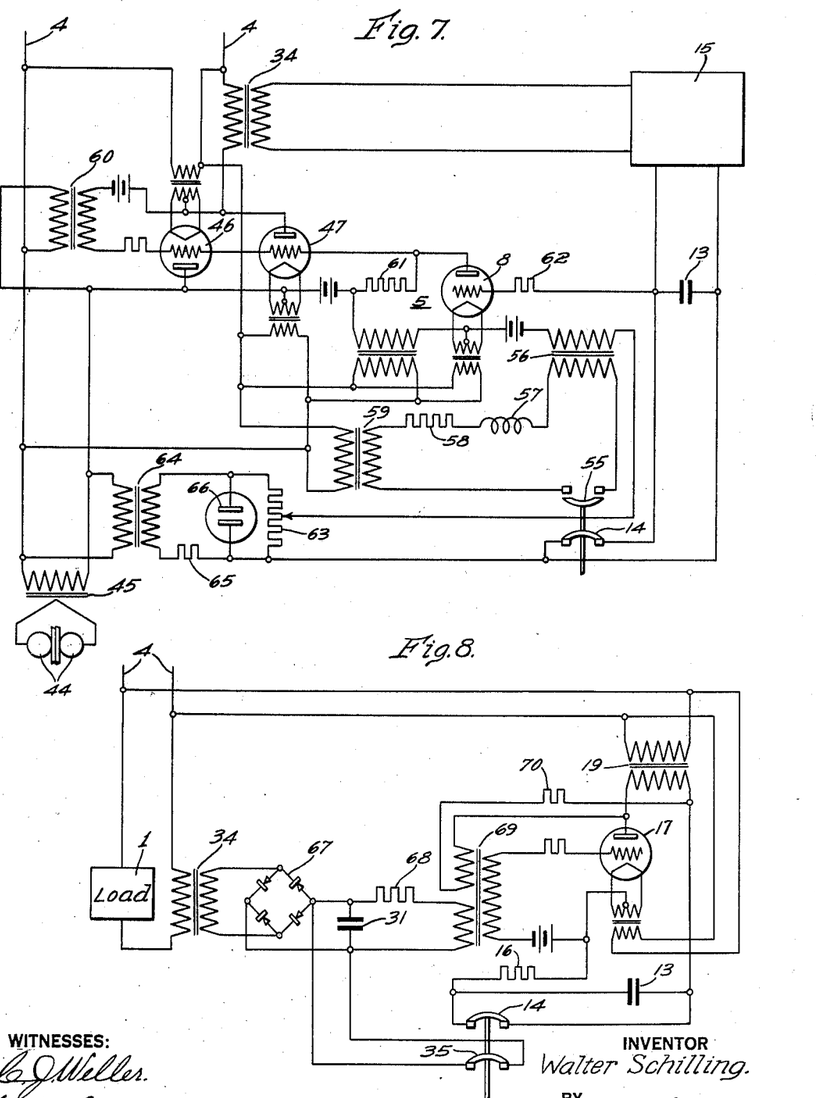
Fig. 7 is a diagrammatic view of a modification of the system shown in Fig. 6.
Figs. 8 and 9 are diagrammatic views of still further modifications of my invention.

The corresponding embodiment is shown in Fig. 7.

The gas or vapor discharge paths 46, 47 controlling the welding current are connected in a follow-up circuit through a transformer 60. The auxiliary circuit, connected to the grid of discharge vessel 47, contains the controllable gas or vapor discharge path 8, the alternating potential source 37 and resistance 61. In the grid circuit of tube 8 there is a grid resistor 62, the reservoir condenser 13 supplied from the intermediate circuit 15, the transformer 56, a blocking potential source and regulable resistance 63. The condenser 13 is so charged by the intermediate circuit 15 that its terminal connected to resistor 62 has a negative potential. The primary winding of transformer 56 is connected through the switch 55 and a series network consisting of inductance 57 and ohmic resistance 58 to the transformer 59. The dimensioning of the auxiliary circuit is such that on the closing of switch 55, a peaked potential which lags the alternating potential 37, impressed on tube 8, by at least 90° is impressed on the secondary winding of transformer 56. The phase displacement between the peaked potential and transformer 56 and the alternating potential impressed on tube 8 serves to avoid transients when tube 8 is first ignited. The regulating resistance 63 is connected through the further resistor 65 and the transformer 64 with the load circuit. The glow tube 66, together with the series resistance 65, constitutes a device for maintaining the potential constant. The tap of resistor 63 is so set that the potential introduced in the grid circuit of tube 8 by it covers the peaked potential. The resistor 61 is so dimensioned that the potential which is impressed on it on the closing of the auxiliary circuit 5 exceeds the blocking potential of discharge vessel 47. Between the switches 55 and 14, there is a coupling connection which corresponds to that of the similarly identified switch in Fig. 6.

With the closing of switch 55 there is impressed on the grid of the discharge vessel 8 an ignition peak. The auxiliary circuit 5 is as a result closed and the grid potential of vessel 47 is raised to the ignition value by means of the potential drop on resistance 61. In consequence of the follow-up connection between the discharge paths 46 and 47, tube 46 at once takes over the load current after the extinction of tube 47. The potential introduced in the grid circuit of tube 8 with the closing of the load circuit through transformer 64 and impedance 63 covers the peaked potential and takes over the further ignition of tube 8. This continues until by the charging of condenser 13 from the intermediate circuit 15, the total control potential of the discharge tube 8 drops below the ignition value.

The purpose of the glow discharge vessel 66 is to supply the impedance 63 with a potential which does not exceed a certain value. In other words, the glow discharge path 66 should always cut off the peaks of the sinusoidal potential which is supplied by transformer 64. The impedance 63, accordingly, receives approximately a rectangular wave-shaped potential which, in such a case, may be introduced into the grid circuit of the discharge vessel 8 by the resistance

63. In an arrangement in which a reactance is supplied through discharge vessels, it is important to render the discharge vessels conductive at instants such that when they are first energized no large over-current occurs. The instant when the vessels are energized is determined by a potential of peaked wave form which the transformer 56 (Fig. 7) supplies in the grid circuit of the discharge vessel 8.

During the further operation, care must be taken that the control potential of the main discharge vessel 47 always attains its ignition value when the current transfers from the other discharge vessel 46 to the discharge vessel 47. The instant when this occurs may vary since the reactance of the welding circuit may change. For this reason it is advantageous not to use the potential of peaked wave form of transformer 56 for ignition after the first half period, but a rectangular wave form control potential which, with certainty, supplies an ignition potential for the main discharge vessel 47 at the instant when the current should be transferred to this discharge vessel. The above-mentioned glow discharge path 66 provides the rectangular wave form control potential for this purpose in the grid circuit of the discharge vessel 8.

In accordance with a further aspect of the invention, the discharge path connected through a (regulating) impedance (resistance) to the main condenser is supplied with a triangular alternating potential and controlled by means of a potential which is composed of a negative blocking potential and a potential of peaked wave form. In this case, the phase position of the latter potential is dependent linearly on the load current and in other respects is so selected that the discharge paths are blocked within the quarter period of positive and rising supply potential. The potential of peaked wave form is introduced in the grid circuit in simple manner with the aid of a saturable transformer which has an excitation linearly dependent on the load current as well as an excitation in form and phase identical to the potential impressed on the discharge paths.

Fig. 8 shows an embodiment of this aspect of the invention.

The load circuit feeds the capacitor 31 through the transformer 34 and the full wave rectifier 67. The latter is connected through the resistance 68 with one of the windings of a three winding saturable transformer 69. A second winding of the transformer 69 is connected through the resistance 70 with the triangular potential source 19. The third winding of transformer 69 is connected in the grid circuit of the gas or vapor filled discharge vessel 17.

Because of the direct current potential impressed on the condenser 31 through transformer 34 and rectifier 67, the transformer 69 has a direct current premagnetization which is proportional to the load current. At the instant when the currents in the two windings on the left side of transformer 69 attain opposite and equal magnitudes, a sudden field variation in the core of transformer 69 takes place and, as a result thereof, a peaked potential impulse is impressed in the grid circuit winding. The instant in the half periods of the potential peak is determined by the potential magnitude of condenser 31, i. e., it varies proportional to the load current. With rising consumer current, the potential peaks become displaced in the sense of earlier ignition of discharge vessel 17.

The circuit arrangement is such that the positive potential peaks occur during the quarter periods when the triangular wave form supply potential is decreasing and the negative potential peaks during the quarter periods when the triangular wave form potential is increasing. The introduction of an additional negative grid potential which blocks the discharge path 17 within the first quarter period of the supply potential is here accordingly not necessary.

The triangular wave form potential is not necessary, if, in accordance with the invention, the main condenser is supplied by a direct current potential which, in its magnitude, is proportional to the square of the load current.

Preferably, the supply potential of the main condenser is here derived from a second auxiliary condenser through a (regulating) impedance (resistance) connected in series therewith; the auxiliary condenser is, in its turn, in accordance with the invention, connected with an alternating potential which has linear rising or falling sides with a slope proportional to the load current, and in other respects, any desired curve shape. The circuit is controlled on the above-mentioned sides of the alternating potential by a second potential with its magnitude or phase proportional to the load current.

In the control of the alternating potential supplying the auxiliary condenser, a gas or vapor filled discharge path is used in the control circuit of which an alternating potential proportional to the load current, as regards phase, is introduced. The phase of the latter is in other respects so selected that the discharge path is blocked in the quarter period of positive and rising alternating potential. The load-current-proportional phase position of the control potential is, in accordance with the invention, attained by the combining of two alternating potential components, which are displaced in phase with reference to each other by 90°, and as regards magnitude, one is constant and the other varies in proportion to the load current. The supply potential of the discharge path is preferably derived at the regulable tap of an impedance (resistance) supplied by the load.

If the controlled discharge path which is thus supplied is connected with the main condenser in the same manner as in the other modifications, the main condenser is charged with potential impulses proportional to the third power of the load current. An auxiliary condenser is connected on the cathode side of the intermediate-circuit discharge path to make certain that the condenser is charged in impulses to that potential at which the intermediate-circuit discharge path ignites. This potential which, in its magnitude, varies with the square of the load current, is then determinative for the charging of the main condenser. If the auxiliary condenser is omitted, the mean potential impressed through the discharge path becomes determinative for the charging of the main condenser, i. e., the main condenser charging impulses are proportional to the third power of the load current.

Figure 9:
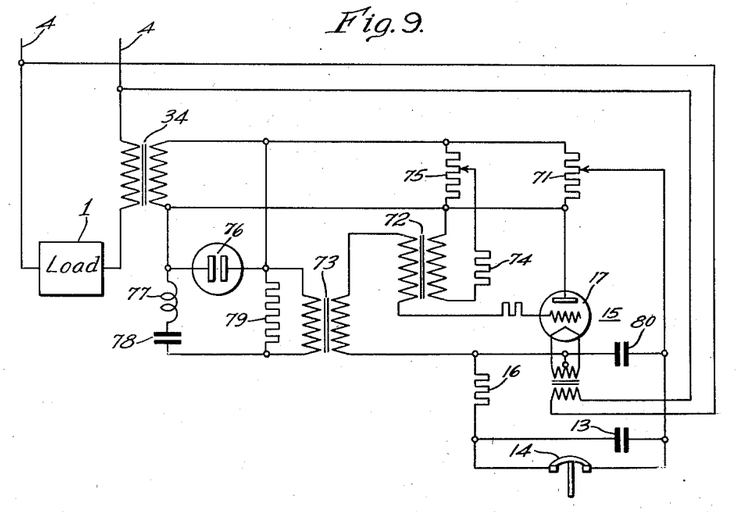

In the embodiment of Fig. 9, the secondary winding of transformer 34 is connected to a resistance 71 from which the supply potential of the intermediate circuit is tapped. In the grid circuit of the discharge path 17, the secondary windings of two transformers 72 and 73, which are also excited through the transformer 34, are connected in series. On the primary side of transformer 72, transformer 34 is connected through resistor 74 and the tap of a further resistor 75. The supply of transformer 73 from transformer 34 takes place through the glow tube 76 and inductance 77 and capacity 78 connected in series. Another resistance 79 is connected in parallel to the primary winding of transformer 73. To the cathode of the discharge tube 17, an auxiliary condenser 80 is directly connected. The potentials introduced in the grid circuit of vessel 17 through transformers 72 and 73 are in quadrature with each other. At the same time, because of the effect of tube 76, the grid potential components supplied by transformer 73 are constant in spite of variations of the load current, while the grid potential component derived at transformer 72 varies in magnitude proportional to the load current. Both potentials are combined into a resultant control potential of discharge vessel 17 which is proportional in its phase position to the consumer current. The resistor 75 and its tap are so selected that even for the highest load current, the operating range of the supply potential of discharge vessel 17 remains limited to its linear sides. Since the slope of these linear sides, just as the phase of the grid potential, varies linearly with the load current, the magnitude at which the anode potential of vessel 17 ignites must be proportional to the square of the load current.

In the Fig. 9 embodiment, the direct current potential which is to be proportional to the square of the load current is supplied by the condenser 80 which is charged through a discharge vessel 17. It is known that a condenser which is connected as the condenser 80 in Fig. 9 will for all practical purposes maintain the potential which is supplied to it through the resistance 71 and the discharge vessel 17. The condenser 13, which is charged from condenser 80 through the resistance 16, must naturally be so small that by its charge the potential of the condenser 80 substantially does not change. The potential of condenser 80, therefore, drops only by a small amount between the individual charging impulses which it receives through the resistance 71 and the discharge vessel 17. In the final analysis, this amounts to a potential on the terminals of condenser 80 which may be regarded as direct current potential.

It is the function of the control circuit of discharge vessel 17 to maintain the magnitude of the potential of condenser 80 proportional to the square of the current in the current transformer 34. This quadratic dependence is attained, first, by maintaining the anode potential of discharge vessel 17, which supplies the resistance 71, proportional to the current, and, second, setting the ignition time point, at which the discharge vessel 17 is ignited, also proportional to the current. This is apparent from the diagram of Fig. 3a. There it is assumed that the potential $U_a$ varies at a constant rate (i. e., does not change in slope with the load current) and that the angle $\alpha$ is proportional to the current. The triangle formed by the terminal points $a$, $b$, $c$, as is explained, has an area which is proportional to the square of the current. It can be seen that these surfaces would be proportional to the third power current if the potential $U_a$ does not vary at a constant rate but increases or decreases proportional to the current. Since in the circuit of Fig. 9 the condenser 13 is directly charged through the discharge vessel 17 just as in the other embodiments, for example, in Figs. 1 and 2, charging impulses are supplied which are proportional to the third power of the current because the anode potential of the discharge vessel 17 does not, as in Fig. 3, vary at a constant rate, but because of the connection to the transformer 34 increases or decreases proportional to the current.

The grid circuit of the discharge vessel 17 should be such that the time point at which the discharge vessel 17 is ignited shortly before the end of a half period of its anode potential is displaced proportional to the current. This is attained by displacing the phase angle of the grid potential of the discharge vessel 17 with reference to the anode potential proportional to the current. For this purpose, the grid transformer 73 produces a constant potential and the grid transformer 72 a potential proportional to the current. The phase angle of the grid potential is then proportional to the current if care is taken that the potential of the two transformers 72 and 73 are in quadrature with each other. The phase displacement of 90° between the two potentials is attained by the reactor 77 which, in addition, functions in cooperation with the condenser 78 for smoothing the current flowing through the resistor 79. The glow discharge path 76 provides that the potential impressed on its terminals does not exceed a definite value in the same manner as the glow discharge path 66 and 67. Preferably another resistor, similar to the resistance 65 in Fig. 7, is here connected between the glow discharge path 76 and the connection to the transformer 34. The circuit consisting of the parts 73, 76, 77, 78 and 79 provides that the potential of the grid transformer 73 is practically constant, accordingly independent of the current of the current transformer 34.

It should be recalled at this time that the further above-mentioned triangular potential may also be replaced by the combination of a sinusoidal potential with a direct current potential. In this arrangement, the direct current potential is to be so dimensioned and the combination potential is so controlled that the linear portion of the sinusoidal potential curve is substantially completely used up.

We arrive at a further very essential simplification of the apparatus according to the invention if in addition to the direct current potential proportional to the load current a further direct current potential equal to the amplitude of the alternating potential is superimposed on the alternating potential supplying the main condenser (which is linear along the contiguous sides of the peak and in other respects has any desired curve shape), and if these potentials are applied to a rectifier having such polarity relative to the polarity of the potential that the reflector blocks the sum of the alternating current potential and the direct current potential equal to its amplitude, but passes the load-current-proportional direct current potential. A dry rectifier may preferably be used here. In this development of the inventive concept, it is advantageous to dispense with the use of controllable gas or vapor discharge paths. An alternating potential of triangular wave form may also be used here as alternating potential linear in the contiguous sides at the peak and in other respects having any desired curve shape.

Figure 10:
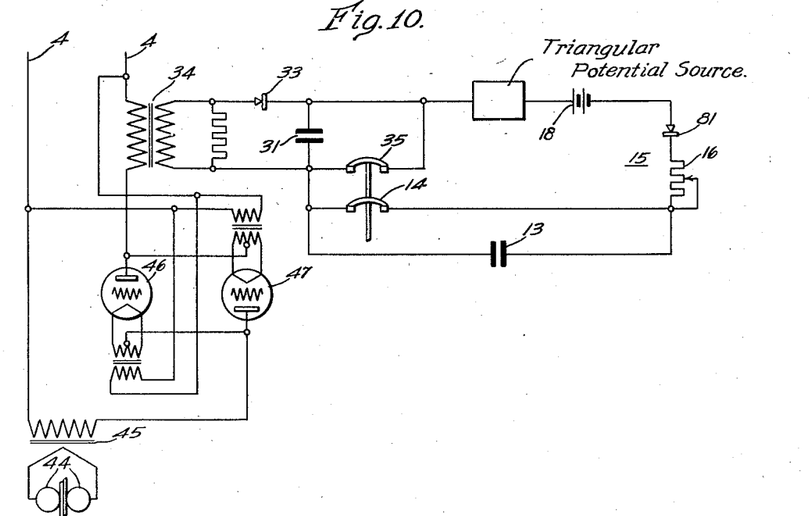
Fig. 10 is a diagrammatic view of a further modification of the system shown in Fig. 6.

A corresponding embodiment is illustrated in Fig. 10. The intermediate circuit 15 contains the main reservoir condenser 13, a regulating resistance 16, a rectifier path 81, preferably in the form of a dry rectifier, the direct current potential source 18, under certain circumstances, regulable, the triangular potential source 19 and the condenser 31.

Figure 11:
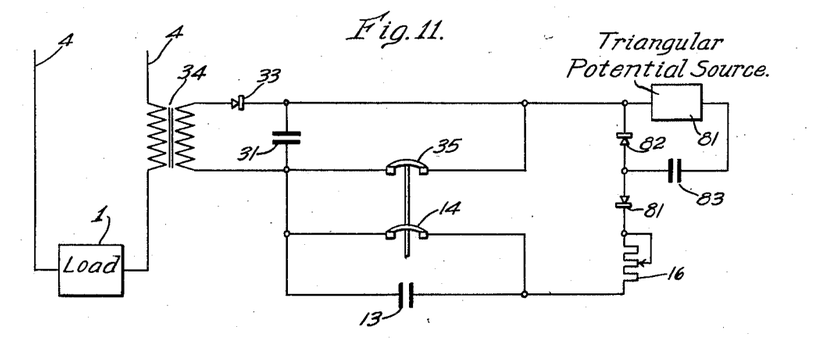
Figs. 11, 13, 14 and 15 are diagrammatic views of still other modifications of my invention.

The embodiment shown in Fig. 11 differs from that in Fig. 10 by the fact that the direct current potential source 18 is replaced by a connection of the rectifier path 82 with the condenser 83. A simple dry rectifier 82 may also be used here.

Figure 12:
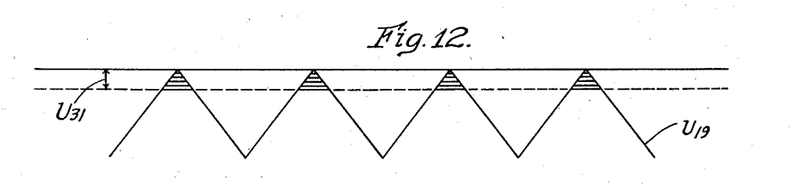
Fig. 12 is a graph illustrating an aspect of my invention.

The operation of the embodiments illustrated in Figs. 10 and 11 is shown graphically in Fig. 12.

The direct current potential source is so adjusted, or the condenser 83 is so charged through the dry rectifier 82, that in both embodiments the alternating potential $U_{19}$ of triangular wave shape supplied by transformer 19 extends in the negative direction in the manner shown in Fig. 12. When switch 35 is closed, all charging of the reservoir condenser 13 is prevented because of the blocking action of the rectifier path 81. If the switch 35 is opened, the condenser 31 receives a direct current potential charge which is directly proportional in its magnitude to the load current. Since the condenser 31 is connected in the intermediate circuit, the peaks of the triangular potential $U_{19}$ are raised to a height $U_{31}$ above the zero line, which height is proportional to the load current. The charging of reservoir condenser 13 which now sets in takes place in steps which are determined by the area of the shaded triangular peaks. The area is, however, proportional to the square of the load current.

The independence of the presence of triangular shaped alternating current potentials is here assured if, in accordance with the invention, a single polar periodic impulse potential having linear contiguous sides at the peak, and in other respects of any desired wave shape, is used as alternating potential having linear contiguous sides at the peak, and in other respects, of any desired wave shape. The advantage of this is that direct current potentials equal in amplitude to the alternating potential is in this case superfluous.

The single polar periodic impulse potential of linear contiguous sides at the peak and, in other respects, of any desired curve shape is, in the most propitious manner, derived through a full wave rectifier, preferably of the dry type from a sinusoidal potential source, for example, the supply source.

Figure 13:
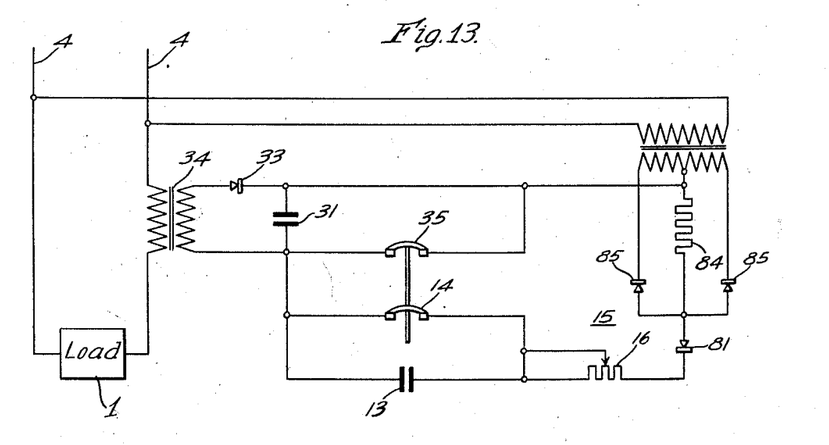

In the corresponding embodiment shown in Fig. 13, the single polar periodic impulse potential of linear contiguous sides at the peak and, in other respects, of any desired curve shape, is derived from resistance 84 of the full wave dry rectifier 85, which is supplied from the main alternating potential source 4.

An increase in operating safety and regulating accuracy of the embodiments described heretofore is attained, in accordance with the invention, by bridging the auxiliary condenser which supplies the direct current potential proportional to the load current by a controllable auxiliary discharge path for the purpose of periodic discharge and controlling the latter through a phase shift arrangement at the frequency of the load current.

For the purpose of complete discharge of the condenser, a direct current source is interposed in the conductor connecting the cathode of the auxiliary discharge path with the condenser with its pole connected to the condenser. In accordance with the invention, the control potential of the auxiliary discharge path is given a proper phase position as well as a peaked wave form to prevent the charging time of the condenser from falling within the operating range of the intermediate circuit potential which effects the charging of the main condenser.

This circuit limits the faulty chargings of the condenser controlling the intermediate circuit to a minimum.

Figure 14:
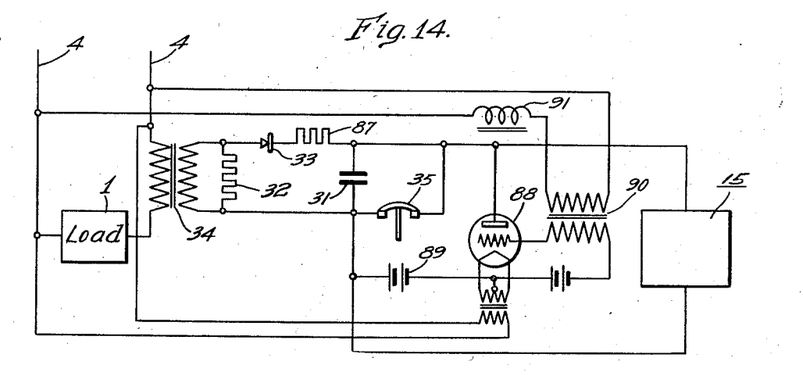

Fig. 14 shows a corresponding embodiment.

The condenser 31 is connected through the resistance 87 and the rectifier path 33 with the load circuit transformer 34. Parallel to the condenser 31, the controllable auxiliary discharge path 88 is connected; in the connecting conductor between the cathode of discharge path 88 and the condenser 31 a direct current potential source 89 is interposed. Its positive pole is connected to the condenser. The control circuit of path 88 is coupled through the saturated transformer 90 and the choke coil 91 with the load circuit. The control potential of path 88 has a peaked wave form because of the choke 91, and its phase position is inherently such that the charging time of condenser 31 falls outside of the operating range of the supply potential of 15. The direct current potential source 89 is of such magnitude that the condenser 31 is completely discharged and is not just at the ignition potential of path 88.

In the embodiments disclosed heretofore, the condenser 31 receives and holds a direct current charge which corresponds to the maximum value of the load current. Circuit closing impulses or harmonics of the load current may, in this arrangement, lead to a very disturbing influence. The above described device prevents this condition to a great extent by charge and discharge of the condenser controlled by the load current. The latter is, in this case, always charged anew in synchronism with the load current to a potential value which corresponds to the half wave mean value of the load current.

In an advantageous modification of the device just described, the rectifier path associated with the auxiliary condenser which supplies the load-current-proportional direct current potential, is bridged by a controllable auxiliary discharge path connected in anti-parallel to the rectifier for the purpose of periodically charging and discharging the auxiliary condenser, and the auxiliary discharge path is controlled through a phase shift arrangement at the frequency of the load current; the direct current potential source of the last described device, which serves to completely discharge the condenser 31, may then be dispensed with.

Figure 15:
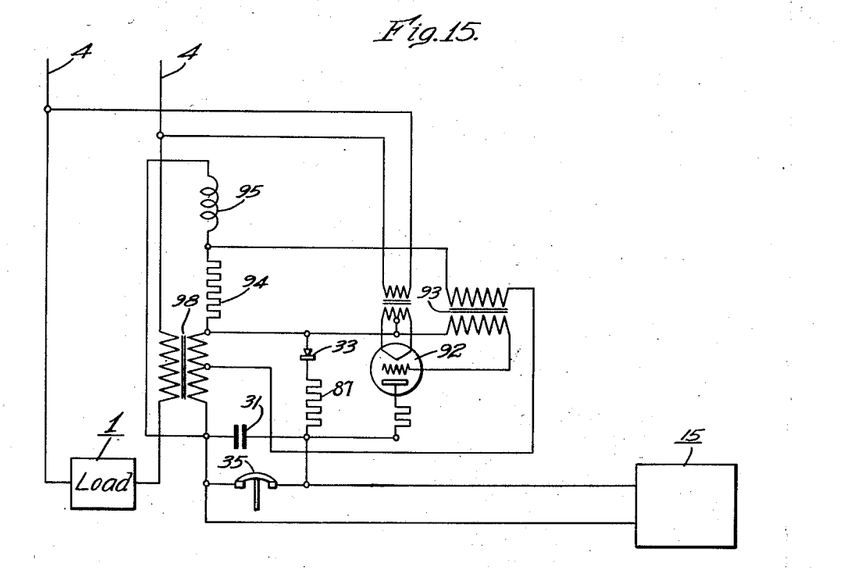

In the corresponding embodiment shown in Fig. 15, the rectifier paths 33 and the resistance 87 are bridged by a controllable discharge path 92 connected in anti-parallel to the rectifier. The grid circuit of controllable discharge path 92 has a transformer 93 which is supplied from the secondary winding of transformer 34 through the phase shift arrangement consisting of resistance 94 and inductance 95.

The auxiliary discharge path here not only discharges but also completely discharges and recharges the condenser 31. The direct current potential source 89 of Fig. 14 may, accordingly, be dispensed with. By means of the phase shift arrangement consisting of resistor 94 and inductance 95, the control potential of discharge path 92 is again so phased that the discharge time of condenser 31 does not fall within the operating range of supply potential 15.

Figure 16:
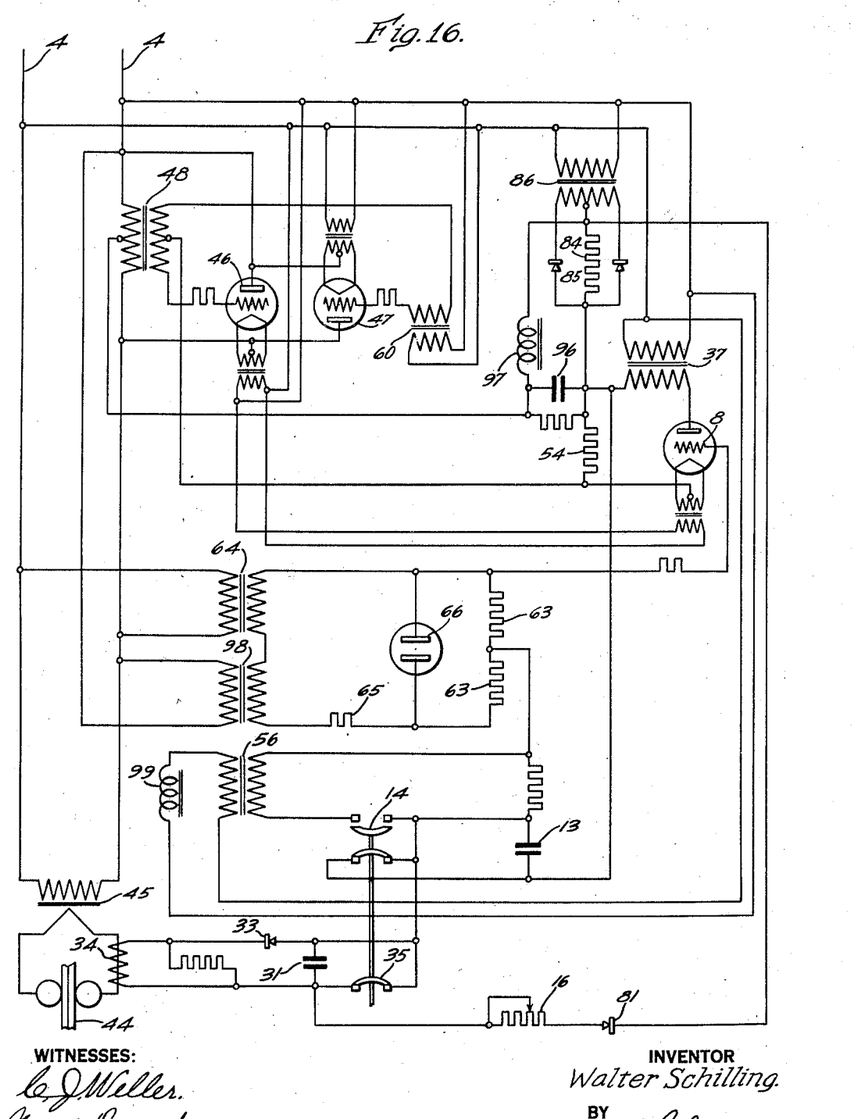
Fig. 16 is a diagrammatic view of a still further modification of the system shown in Fig. 6.

In Fig. 16, a complete circuit according to the invention as applied to spot welding, by means of controllable gas or vapor discharge paths, is illustrated.

An explanation of this figure is superfluous in view of the selected identification of the various elements, the latter being used in the circuits described heretofore. The condenser 96, which is connected through the smoothing choke 97 to the potential source which supplies the unidirectional periodic impulse potential of linear contiguous sides at the peaks and, in other respects, of any desired wave form is new to the intermediate circuit. The condenser 96 serves as blocking potential source for the load discharge paths 46, 47. The transformer 98 connected to the primary winding of transformer 48 supplies the blocking potential of tube 8 before the initiation of the welding process. When the welding process sets in by the operation of the reversing switch 14 and the ignition of the discharge path 45, the potential on the primary winding of transformer 48 collapses. The ignition potential for the discharge path 8 during its current conducting half periods is then supplied by the transformer 64. Through the choke 99 and the transformer 56, a peaked potential is introduced in the grid circuit of discharge vessel 8 for the purpose of first igniting it. The current which charges condenser 31 to a potential proportional to the load current is derived here by means of transformer 34 in the welding electrode circuit. In similar manner, the transformer 34 may also be supplied from the welding electrode circuit.

I claim as my invention:

1. For use in supplying power from a source of current to a load, the combination comprising potential responsive valve means interposed between said source and said load for determining the time during which current flows to said load, a capacitor connected to said valve means so that its potential controls the operation of said valve means, and means for charging said capacitor at timed intervals, each charging impulse being proportional to the square of load current strength.

2. For use in supplying power from a source of current to a load, the combination comprising potential responsive valve means interposed between said source and said load for determining the time during which current flows to said load, a capacitor connected to said valve means so that when it attains a predetermined potential it interrupts the operation of said valve means, means for charging said capacitor at timed intervals, each charging impulse being proportional to the square of load current strength, and means for simultaneously initiating the supply of current to said load and the charging of said capacitor.

3. For use in supplying power from a source of current to a load, the combination comprising potential responsive valve means interposed between said source and said load for determining the time during which current flows to said load, a capacitor connected to said valve means so that when it attains a predetermined potential it interrupts the operation of said valve means, means for charging said capacitor at timed intervals, each charging impulse being proportional to the square of load current strength, said charging means including means for impressing across said capacitor potential impulses each of which has a perpendicular wave front and a right triangular wave form, the base of each wave being in length proportional to the load current strength, and means for simultaneously initiating the supply of current to said load and the charging of said capacitor.

4. Apparatus according to claim 2 characterized by the fact that the capacitor is charged through an auxiliary electric discharge valve having a plurality of principal electrodes in circuit with said capacitor and a control electrode and by means for impressing across said principal electrodes a potential of triangular wave shape, means for impressing a potential between said control electrode and one of said principal electrodes maintaining said auxiliary valve non-conductive when the rising branch of each wave is impressed between said principal electrodes, and means for impressing a potential between said control electrode and one of said principal electrodes to render said auxiliary valve conductive at an instant in each period which is displaced from the instant at which the potential decreases to zero by a time interval proportional to the load current.

5. Apparatus according to claim 2 characterized by the fact that an auxiliary electric discharge valve having a control circuit, the potential which is controlled by the capacitor is a part of the connecting means between the capacitor and the main valve.

6. Apparatus according to claim 2 characterized by charging means for the capacitor which comprises an asymmetrically conductive electric discharge valve having principal discharge path means in circuit with said capacitor and a control circuit, means for impressing a potential of triangular wave form across said principal discharge path means, and means for impressing in said control circuit a potential proportional to the load current strength, a potential of such phase and magnitude that it assures that said valve is non-conductive during the half periods of said triangular potential when the instantaneous potential across said principal path means is increasing and a potential of such phase and magnitude that the net control potential is raised by it above the critical value just prior to the instants in the periods of said triangular potential when the triangular potential decreases to zero, said last-named potential having a linear wave front when the net potential is rising to above the critical value.

7. Apparatus according to claim 2 characterized by charging means for the capacitor which comprises an asymmetrically conductive electric discharge valve having an anode and a cathode in circuit with said capacitor and a control circuit including said cathode and a control electrode, the characteristic of said control circuit being such that said valve becomes conductive when said control electrode and said cathode are at substantially the same potential, means for impressing a potential of triangular wave form between said anode and cathode, and means for impressing in said control circuit a potential proportional to the load current strength, a potential of such phase and magnitude that it assures that said valve is non-conductive during the half periods of said triangular potential when the instantaneous potential across said anode and cathode is increasing, and a potential of triangular wave form which is opposite in phase to the anode-cathode potential.

8. For use in supplying power from a source of alternating current to a load, the combination comprising a pair of electric discharge valves each having a control circuit interposed between said source and said load to conduct current during alternate half periods from said source to said load, means independent of said load for impressing a potential in the control circuit of one of said valves to render said valve conductive, means for deriving a potential from said load when it is supplied through said one valve and means including means for shifting the phase of a potential relative to said source for impressing a potential derived from said derived potential in the control circuit of said other valve to render said other valve conductive, said phase shifting means being connected in the control circuit of said other valve.

9. For use in supplying power from a source of alternating current to a load, the combination comprising a pair of electric discharge valves each having a control circuit interposed between said source and said load to conduct current during alternate half periods between said source and said load, an auxiliary electric discharge valve having a control circuit, means for coupling said auxiliary valve to one of said main valves so that when it is conductive said one main valve is rendered conductive, means independent of said load for impressing a potential of peaked wave form in the control circuit of said auxiliary valve to render said auxiliary valve conductive, means responsive to the current flow through said load when it is supplied through said one main valve to render said other main valve conductive, and means responsive to the current flow through said load when it is supplied through said other main valve to supply a potential in the control circuit of said auxiliary valve which has a magnitude sufficient to render said auxiliary valve conductive over a phase angle which begins substantially earlier than said potential of peaked wave form and ends substantially later than said potential of peaked wave form.

10. For use in supplying power from a source of alternating current to a load, the combination comprising a pair of electric discharge valves each having a control circuit interposed between said source and said load to conduct current during alternate half periods between said source and said load, an auxiliary electric discharge valve having a control circuit, means for coupling said auxiliary valve to one of said main valves so that when it is conductive said one main valve is rendered conductive, means independent of said load for impressing a potential of peaked wave form in the control circuit of said auxiliary valve to render said auxiliary valve conductive at a phase point in a half cycle of said source displaced by substantially 90° from the point of zero potential, means responsive to the current flow through said load when it is supplied through said one main valve to render said other main valve conductive, means responsive to the current flow through said load when it is supplied through said other main valve to supply a potential in the control circuit of said auxiliary valve which has a magnitude sufficient to render said auxiliary valve conductive over a phase angle which begins substantially earlier than said potential of peaked wave form and ends substantially later than said potential of peaked wave form, a capacitor in the control circuit of said auxiliary valve, and means for charging said capacitor in impulses varying inversely as the square of the load current strength to a potential such that said auxiliary valve is eventually rendered non-conductive.

11. In combination, a capacitor, a source of periodic potential having a triangular wave form, an electric discharge valve having a control circuit interposed between said source and said capacitor and means for impressing a potential in said control circuit to render said valve conductive, said impressing means having a saturable transformer supplied with a pair of saturating windings, means for supplying one of said windings with current from said source, and means for supplying the other of said windings with current of a magniture intermediate the extreme magnitude of the current supplied to said one winding.

12. Apparatus according to claim 11 characterized by the fact that the capacitor controls the flow of current through a load and the other winding is supplied with direct current which is proportional to the load current strength.

13. In combination, a current consumer, a capacitor, a source of periodic potential having a rectilinear wave form along contiguous sides at the peaks and for the rest any desired wave form, means interposed between said source and said capacitor for just blocking current flow to said capacitor at the potential level of said peaks, and means for raising the potential level of said peaks to an extent dependent on the consumer current strength so that current is conducted during each period of said source to said capacitor to an extent dependent on the square of said consumer current strength.

14. Apparatus according to claim 13 characterized by the fact that the means for raising the potential of the peaks includes an auxiliary capacitor charged to a potential proportional to open the consumer current and by an electric discharge valve for discharging said auxiliary capacitor after each charging of the main capacitor.

15. For use in supplying constant quantities of energy from a source to a load, the combination comprising valve means for controlling the current flow from said source to said load, a control circuit for said valve means including a capacitor, the charging potential of which determines the time during which current flows to said load through said valve means, and means for so charging said capacitor that said time varies inversely as the square of the load current.

16. Apparatus according to claim 15, characterized by a regulating impedance in the control circuit for the valve means through which the capacitor is charged at a potential, the mean value of which varies as the square of the load current.

17. For use in supplying power from a source of current to a load, the combination comprising potential responsive valve means interposed between said source and said load for determining the time during which current flows to said load, a capacitor connected to said valve means so that its potential controls the operation of said valve means, and means for charging said capacitor at timed intervals, each charging impulse being proportional to the square of load current strength, said charging means including a source of potential of triangular wave form.

18. Apparatus in accordance with claim 1 characterized by charging means including a periodic potential having a wave, a certain portion of which is linear and means for controlling the application of said potential to the capacitor during the intervals when its wave is linear in linear dependence upon the magnitude of the load current.

19. Apparatus in accordance with claim 1 characterized by charging means including a periodic potential having a wave, a certain portion of which is linear and a second potential, the magnitude of which depends linearly on the load current for controlling the application of said first-named potential to said capacitor during the intervals when its wave is linear.

20. Apparatus in accordance with claim 1 characterized by charging means including a periodic potential having a wave, a certain portion of which is linear and a second potential, the phase of which relative to said first-named potential depends linearly on the load current for controlling the application of said first-named potential to said capacitor during the intervals when its wave is linear.

21. For use in supplying power from a source of current to a load, the combination comprising potential responsive valve means interposed between said source and said load for determining the time during which current flows to said load, a capacitor connected to said valve means so that its potential controls the conductivity of said valve means, a charging circuit for charging said capacitor at timed intervals with impulses proportional to the square of the load current, said circuit including an electric discharge valve having a plurality of principal electrodes and a control electrode, means for impressing a triangular-wave-form potential between said principal electrodes and means for impressing between said control electrode and one of said principal electrodes a potential proportional to the load current, a potential of such phase, polarity and magnitude that it assures that said discharge valve means is non-conductive during the intervals of said triangular potential when the triangular potential is increasing and a second potential of triangular wave form which is opposite in phase to said first-named triangular potential.

22. For use in supplying power from a source of current to a load, the combination comprising potential responsive valve means interposed between said source and said load for determining the time during which current flows to said load, a capacitor connected to said valve means so that its potential controls the conductivity of said valve means, a charging circuit for charging said capacitor at time intervals with impulses proportional to the square of the load current, said circuit including an electric discharge valve having a principal circuit and a control circuit, means for impressing in said principal circuit a potential of triangular wave form and means for impressing in said control circuit an ignition potential for said discharge valve which is of peaked wave form and the phase of which, relative to said triangular wave form potential, is proportional to the load current, said peaked waveform potential being effective to ignite said valve during the quarter cycle when said triangular wave-form potential is decreasing.

23. Apparatus according to claim 22, characterized by the fact that the potential of peaked wave form is derived from a saturable transformer having a presaturation winding supplied by a current dependent on the load current and another winding supplied with current derived from the principal circuit of the discharge path.

24. For use in supplying constant quantities of energy from a source to a load, the combination comprising valve means for controlling the current flow from said source to said load, a control circuit for said valve means including a capacitor, the charging potential of which determines the time during which current flows to said load through said valve means, and means for so charging said capacitor with a potential proportional to the square of the load current.

25. For use in supplying constant quantities of energy from a source to a load, the combination comprising valve means for controlling the current flow from said source to said load, a control circuit for said valve means including a capacitor, the charging potential of which determines the time during which current flows to said load through said valve means, and means for so charging said capacitor with a potential proportional to the square of the load current, said charging means comprising a second capacitor so large as compared to said first-named capacitor that its potential is unaffected by the charging of said first-named capacitor, an electric discharge valve having a principal circuit including said second capacitor and a source of periodic potential and a control circuit, and means for impressing in said control circuit a potential for igniting said discharge valve during the intervals when the wave form of said periodic potential is linear, the phase position of said potential with respect to said periodic potential being proportional to said load current.

26. In combination, a capacitor, a source of periodic potential, the wave form of which is linear at the peaks, means for connecting said capacitor in circuit with said periodic potential through a rectifier and a biasing potential such that current flow through said rectifier is just blocked, and means for counteracting said biasing potential.

27. In combination, a capacitor, a source of periodic potential, the wave form of which is linear at the peaks, means for connecting said capacitor in circuit with said periodic potential through a rectifier and a biasing potential such that current flow through said rectifier is just blocked and a direct current potential proportional to a selected physical quantity for counteracting said biasing potential.

28. In combination, a capacitor, a source of alternating potential, the wave form of which is linear at the peaks, means for connecting said capacitor in circuit with said alternating potential through a rectifier and a direct current biasing potential equal to the amplitude of said alternating potential such that current flow through said rectifier is just blocked and means for counteracting said biasing potential.

29. In combination, a capacitor, a source of alternating current, means for deriving rectified half waves of current from said source, means for supplying said rectified half waves in a circuit including said capacitor and a rectifier blocking the flow of said rectified half waves of current and means for impressing a direct current potential in said circuit of such polarity as to permit the flow of current during intervals dependent on said direct current potential.

30. For use in supplying constant quantities of energy from a source to a load, the combination comprising valve means for controlling the current flow from said source to said load, a control circuit for said valve means including a capacitor, the charging potential of which determines the time during which current flows to said load through said valve means, and means for charging said capacitor with a potential proportional to the square of the load current, said charging means comprising a second capacitor.

31. For use in supplying constant quantities of energy from a load to a source, the combination comprising valve means for controlling the flow of current from said source to said load, a control circuit for said valve means including a capacitor, the charging potential of which determines the time during which current flows to said load through said valve means, means, including a second capacitor, for charging said first-named capacitor to a potential proportional to the square of the load current and means for discharging said second capacitor in synchronism with said source.

32. For use in supplying power from a source of current to a load, the combination comprising main electric discharge valve means having control circuit means interposed between said source and said load for controlling the current flow from said source to said load, an auxiliary electric discharge valve, having a control circuit, interposed in said control circuit means for controlling said main electric discharge valve means, a capacitor in said control circuit for timing the conductivity of said auxiliary valve in dependence upon the potential on said capacitor, an auxiliary circuit including an auxiliary source of potential for charging said capacitor in proportion to the square of the current flow through said load, and means for connecting said auxiliary circuit to said control circuit means so that it functions as a blocking potential for said main valve means.

33. For use in supplying power from a source of current to a load, the combination comprising main electric discharge valve means, having control circuit means interposed between said source and said load for controlling the current flow from said source to said load, an auxiliary electric discharge valve, having a control circuit, interposed in said control circuit means for controlling said main electric discharge valve means, a capacitor in said control circuit for timing the conductivity of said auxiliary valve in dependence upon the potential on said capacitor, an auxiliary circuit including an auxiliary source of potential for charging said capacitor in proportion to the square of the current flow through said load, means for initiating the charging of said capacitor, means for simultaneously initiating the conductivity of said auxiliary valve to render said main valve means conductive and means responsive to the current thereafter supplied to said load for maintaining said auxiliary valve conductive until said capacitor attains a predetermined charge.

34. For use in supplying power from a source of current to a load, the combination comprising means interposed between said source and said load for controlling the flow of current to said load, and means, including a source of periodic potential having a wave-form which is linear at the peaks and means responsive to said load current, for regulating the operation of said controlling means in dependence upon the inverse square of the magnitude of the current flowing to said load.

35. For use in supplying power from a source of current to a load, the combination comprising valve means interposed between said source and said load for determining the time during which current flows from said source to said load, a source of potential having a triangular wave-form, and means responsive to said source and to said load current for operating said valve means to limit the time during which current flows to said load in proportion to the inverse square of the current strength.

36. For use in supplying power from a source of current to a load, the combination comprising means for controlling the flow of current from said source to the load, and means, including an auxiliary source of potential and means responsive to the load current associated therewith, for regulating the operation of said controlling means in dependence upon the inverse square of the magnitude of the load current.

37. For use in supplying power from a source of current to a load, the combination comprising valve means for controlling the flow of current from said source to the load, a control circuit for said valve means, said valve means being connected to interrupt the flow of load current upon the impression in said control circuit of a potential greater than a predetermined critical value, and means, including an auxiliary source of potential and means responsive to said load current, for impressing a potential in said control circuit which first rises above said critical value after said load current has been flowing for a time which varies inversely as the square of the load current magnitude.

WALTER SCHILLING.